United States Patent [19]

Thomson et al.

[11] 4,359,201

[45] Nov. 16, 1982

[54] PAYLOAD DEPLOYMENT FROM SHUTTLE WITH LINEAR AND ANGULAR VELOCITY

[75] Inventors: Graham S. Thomson, Pacific Palisades; Alois Wittmann, Rancho Palos Verdes, both of Calif.

[73] Assignee: Hughes Aircraft Company, Culver City, Calif.

[21] Appl. No.: 125,807

[22] Filed: Feb. 28, 1980

[51] Int. Cl.³ .............................................. B64G 1/64
[52] U.S. Cl. .......................... 244/158 R; 244/137 R
[58] Field of Search ............... 244/158, 159, 160, 161, 244/137 R, 118.1

[56] References Cited

U.S. PATENT DOCUMENTS

| | | | |
|---|---|---|---|
| 3,380,687 | 4/1968 | Wrench et al. | 244/158 |
| 3,815,849 | 6/1974 | Meston | 244/160 |
| 4,082,240 | 4/1978 | Heathman et al. | 244/161 |
| 4,213,586 | 7/1980 | Sengstock et al. | 244/158 |

OTHER PUBLICATIONS

SCG 66710V/Dec. 1976, "Syncom IV-Space Shuttle Orbital Flight Mission", Public Ser. Satellite Consortium Conference, Wash. D.C., Jan. 1977.
SCG 66626V/"StS Optimized Spin Stabilized Satellite for Experimental Services", 10/18/76, Hughes Aircraft.
Wheelon, "The Impact of Space Shuttle on the Future of Communication Sat.", 11/9/78.

Primary Examiner—Galen L. Barefoot
Attorney, Agent, or Firm—E. F. Oberheim; W. H. MacAllister; A. W. Karambelas

[57] ABSTRACT

A payload such as a spacecraft is deployed from launch vehicle with linear and angular velocity, using a structural arrangement for applying a tangential, single point ejection force to the spacecraft, in which, the single point ejection force and the spacecraft/launch vehicle reaction points enclose the spacecraft center of mass and center of percussion.

8 Claims, 6 Drawing Figures

PAYLOAD DEPLOYMENT FROM SHUTTLE WITH LINEAR AND ANGULAR VELOCITY

BACKGROUND OF THE INVENTION

1. Field of the Invention

This invention relates generally to arrangements for launching payloads, such as spacecraft or satellites from launch vehicles and, more particularly to launching arrangements in which the payload is gyroscopically stabilized by spinning at the time it is launched or ejected from the launch vehicle.

2. Description of the Prior Art

A publication SCG 66710V/Dec 1976, entitled, "Syncom IV Space Shuttle Orbital Flight Test Mission", reported in the Prior Art Statement filed concurrently with this application describes an arrangement for launching a spacecraft from a launch vehicle, which comprises a U-shaped or open-ended cradle having an ejection spring mechanism located on one side thereof for pushing against a small trunnion that protrudes from one side of the spacecraft. A pivot point is formed on the opposite side of the spacecraft which also has a protruding trunnion that rests on a mating surface formed in the cradle. Although not described in this publication, it is necessary that both the spring mechanism and the pivot point lie in a plane normal to the spin axis of the spacecraft and ideally, the plane also passes through the center of mass of the spacecraft. Release of the ejection spring mechanism couples a tangential thrust force, acting in said plane, to the spacecraft. Assuming the geometry of the structure is precise, when the spacecraft tangential thrust force is applied, the spacecraft rotates about the pivot point, simultaneously producing translation and rotary movement of the spacecraft without nutation as it leaves the cradle. After the ejection force ceases, the spacecraft free body motion is a rolling motion up a virtual (imaginary) ramp thus maintaining the imparted linear and angular momentum. The separation velocity and rotation speed of the spacecraft depend on its inertia characteristics, diametral dimensions, ejection force and ejection stroke length.

SUMMARY OF THE INVENTION

This invention provides improvement over such prior art in an arrangement which again uses a single point ejection force for simple deployment mechanization. Here, however, the force application and spacecraft/cradle reaction points enclose the payload center of mass and center of percussion which minimizes the need for elaborate holddown mechanisms at the force reaction points and for precise alignment of the push-off force with the center of mass and the reaction pivot point. Structurally this involves, at a minimum, a pair of spaced pivot points on one side of the spacecraft and a force application point on the other supporting the spacecraft in the open end of the cradle. These points define a triangle which encloses the center of mass of the spacecraft. Such a three-point suspension system defines the spacecraft attitude at separation from the launch vehicle. Rotation of the payload or spacecraft about fixed supports, such as the spaced pivot points, ensures physical clearance during the ejection phase of the launch as well as a well-defined deployment path. Also, the affects of spacecraft attitude disturbances due to liquid propellant sloshing are avoided while the spacecraft is being separated and in physical contact with the shuttle or launch vehicle.

In accordance with the deployment method of the invention, the spacecraft is stored in the bay of a launch vehicle such as the space shuttle with the axis about which the spacecraft will rotate during ejection, aligned parallel to the roll axis of the shuttle, whereby the spacecraft attitude is set by the attitude of the shuttle and maintained during ejection by simultaneously imparting both linear and angular momentum to the spacecraft. As a consequence, no active control is required prior to firing the perigee propulsion stage of the spacecraft. A further advantage of the invention is that the ejection of the spacecraft is accomplished by a single mechanization which comprises a thrust mechanism on one side and a two-point pivot structure on the other side. Also, the ejection mechanism which imparts linear and angular momentum to the spacecraft provides a separation velocity as well as gyroscopic stability. Additional advantages of the mechanization in accordance with this invention include:

spacecraft attitude can be maintained without the need for active control;

gyroscopic stability insures a well-defined deployment path to maintain adequate clearance as the spacecraft leaves the shuttle bay;

spacecraft spin insures propellant feed at the thrusters which are to be used subsequently for additional spinup;

a single point pushoff ejection structure provides the basis for a simple deployment mechanization; and the deployment mechanization and the deployment motions are insensitive to minor center of mass location uncertainties.

BRIEF DESCRIPTION OF THE DRAWINGS

The invention, including its various objects, features, and advantages, may be more readily understood with reference to the following detailed description of two embodiments thereof, taken in conjunction with the accompanying drawings, wherein like reference numerals designate like structural elements, and in which.

DETAILED DESCRIPTION

Figure 1:
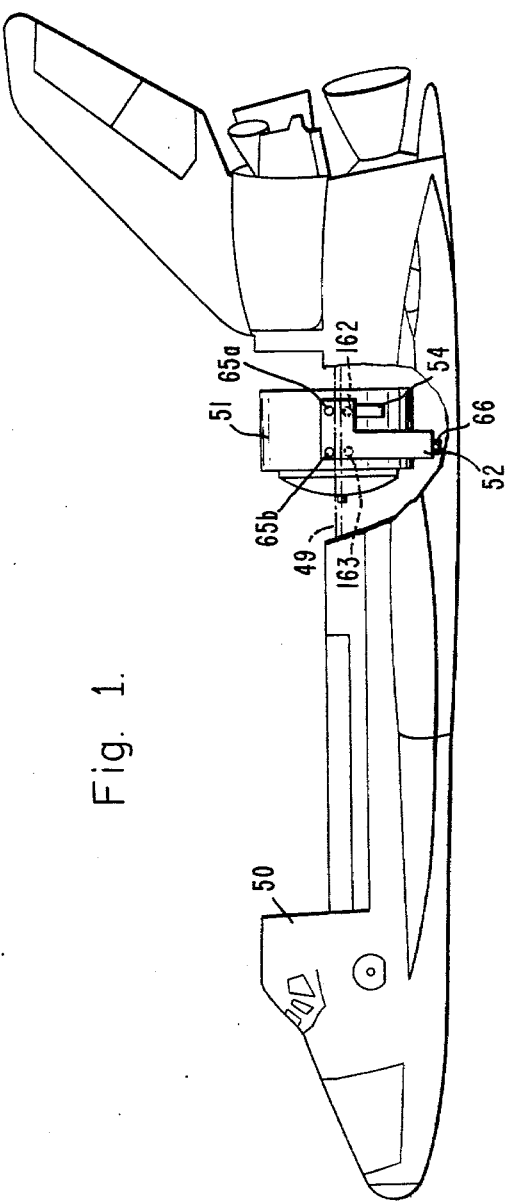
FIG. 1 is a drawing of a space shuttle showing the payload bay doors open, and having a portion broken away to show a spacecraft in a supporting cradle mounted therein.

Referring to FIG. 1 of the drawings, there is shown a space shuttle 50 developed by the National Aeronautics and Space Administration. The space shuttle 50 is shown with its payload bay doors open, and a portion is broken away to show a spacecraft 51 mounted in the payload bay by means of a cradle 52. The cradle 52 has trunnions on both sides adjacent its upper ends. Only trunnions 65a and 65b are visible in FIG. 1. These trunnions are carried by the longerons 49 (shown in dot-dash outline) of the space shuttle, supporting the cradle 52 in the payload bay of the space shuttle 50.

Figure 2:
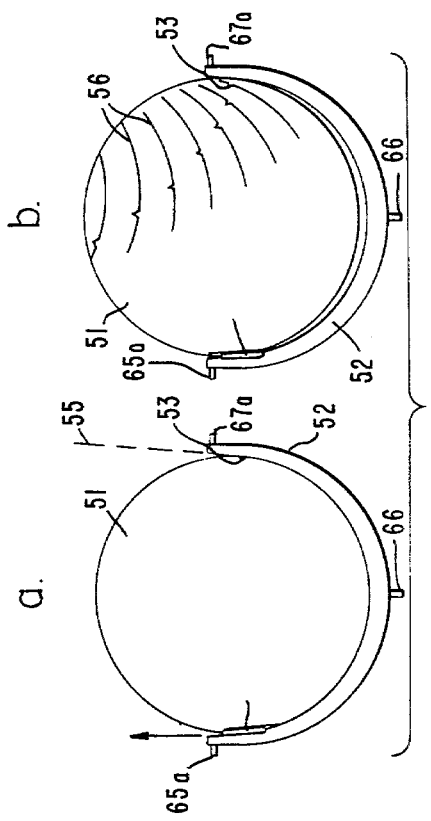
FIGS. 2a and 2b schematically illustrate the ejection of the spacecraft from the payload bay of the space shuttle.

The spacecraft 51 is stowed in the bay of the space shuttle 50 with the spin axis parallel to the roll axis of the shuttle 50. Thus, the attitude of the spacecraft 51 is set by the attitude of the shuttle 50 and is maintained during ejection by simultaneously imparting both linear and angular momentum to the spacecraft 51. The spin provides gyroscopic stabilization. FIGS. 2a and 2b show the spacecraft 51 before and during ejection from the cradle. Integration of the spacecraft and cradle provides a pivot axis 53 (see FIG. 3) at one side of the spacecraft 51, paralleling the spacecraft's central axis, and provides an ejection mechanism 54, a spring, or piston or other thruster, at the other side of the spacecraft 51.

Figure 3:
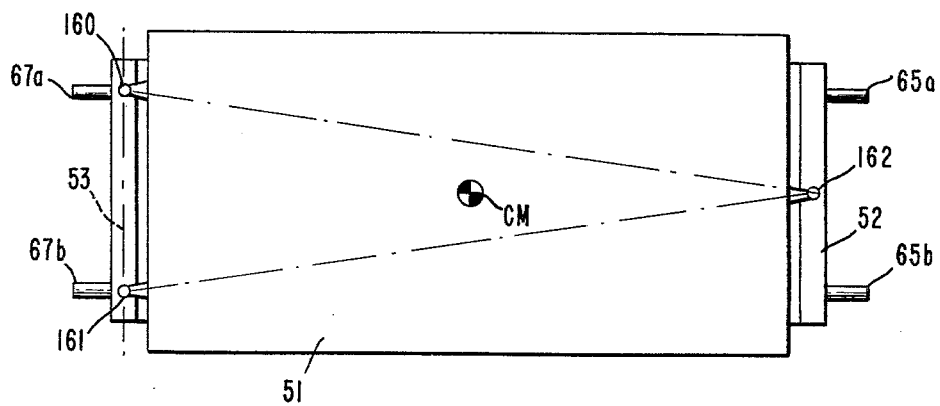
FIG. 3 diagrammatically illustrates one embodiment of this invention comprising a simple three-point attachment, single point pushoff arrangement for a spacecraft showing the center of mass contained within the sides of the triangle defined by the three points.

As will be seen in FIG. 3 the specific arrangement involves a three-point ejection system including two longitudinally spaced pivot points 160 and 161, defining pivot axis 53, supported by the upper ends of the left-hand side of the cradle 52 as viewed. A single push off point is provided at the upper end of the right side of the cradle 52 at the point 162. The three points 160, 161 and 162 define a triangle which includes or encloses the center of mass CM as indicated, the single push off point being the vertex or apex of the triangle at 162. The longitudinally spaced pivot points 160 and 161 provide spaced reaction points which carry the reaction loads during the satellite ejection interval and thus remain engaged as long as an ejection thrust force exists at the push off point 162, which lifts that side of the spacecraft from the cradle. After the deployment force ceases, the spacecraft contact force at its pivot points 160 and 161 also ceases and the spacecraft simply lifts off while simultaneously rotating, the direction of separation being normal to the plane defined by the pivot points and the spacecraft center of mass at force termination. Free body spacecraft rotation is about its center of mass. Separation velocity and rotational speed depend upon satellite intertia, ejection force and stroke length as well as spacecraft diameteral dimensions. The attitude precision of the spacecraft after separation from the shuttle depends upon shuttle stability during spacecraft ejection, structural rigidity of pivots and their supports and fuel motion.

Figure 4:
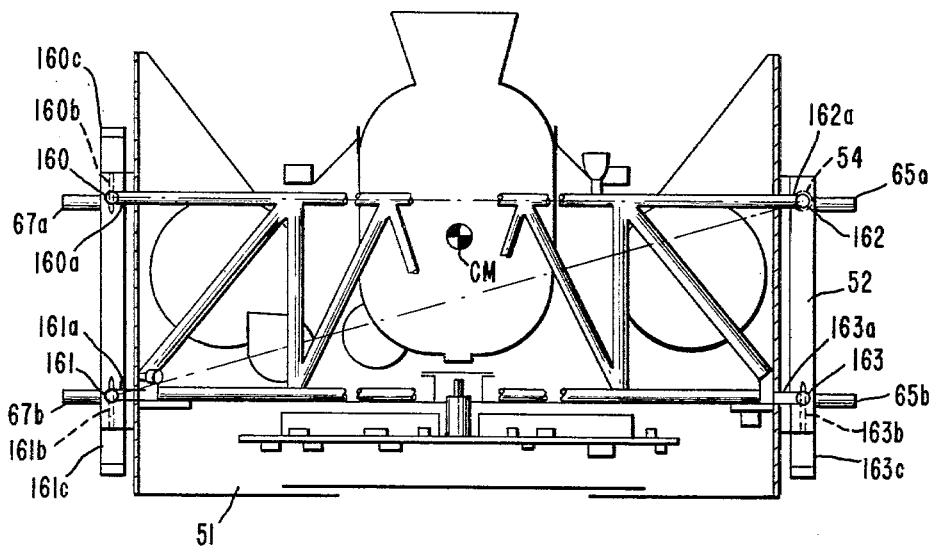
FIG. 4 is a view, fragmentally in section, of a second embodiment of this invention, looking down on the spacecraft in its cradle mount.
Figure 5:
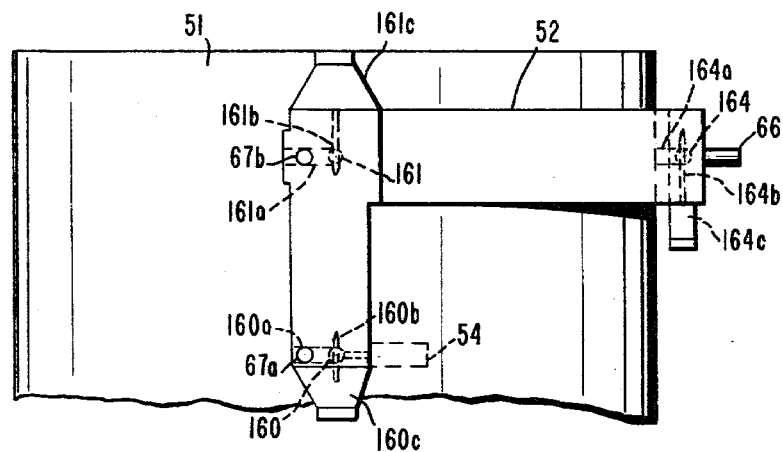
FIG. 5 is a side view of the spacecraft and cradle assembly of FIG. 4.
Figure 6:
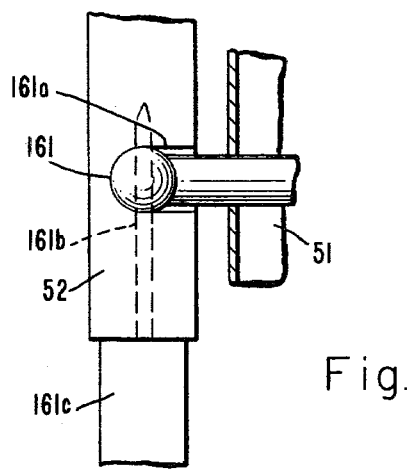
FIG. 6 is a detail of a locking mechanism.

FIGS. 4 and 5 illustrate a present embodiment of this invention, employing the principles discussed in connection with FIG. 3, in a five-point suspension arrangement utilizing three-points for ejection including a single point push off. As seen in the fragmentarily sectioned elevation view (FIG. 4), the tubular satellite frame is rectangular in configuration and is provided with four attachment points, in longitudinally spaced positions, in diametrically opposite positions on the spacecraft. In these illustrations the pivot points are defined as balls, again identified as 160 and 161, attached to the end of extensions of the spacecraft tubular structure. The pushoff point is also ball, again designated 162, and a fourth point of suspension on the same side of the satellite as the push off point 162, is a ball designated 163. As seen in FIGS. 4, 5 and 6 these balls are received in cradle slots 160a, 161a, 162a, and 163a, respectively opening through the upper ends of the cradle as seen in FIG. 4. Pins 160b, 161b, 163b, 164b protrude through the respective balls to lock the spacecraft in the cradle and are withdrawn by respective motors 160c, 161c, 163c and 164c when the spacecraft is to be launched. Additional details are not shown, in the interest of simplicity, since they form no part of this invention.

In operation, once the shuttle is in its parking orbit, the shuttle attitude is precisely adjusted for spacecraft launch. Assuming the pins 160b, 161b, 163b and 164b have been withdrawn from the respective balls, actuation of the ejection mechanism 54 applys a force to the push off point 162 and the spacecraft is thrust from the cradle rotating about the points 160 and 161, i.e., hinge axis 53. Referring to FIG. 4, depicting the system geometry looking down upon the open end of the cradle, it will be seen that the triangle defined by the pivot points 160 and 161 and the push off point 162 encloses or contains the center of mass of the spacecraft as viewed. Thus, while the push off point 162 is offset from that plane which is normal to the spin axis of the satellite and which passes through the center of mass, nutation is obviated by the rotational stability provided by the spaced pivot points 160 and 161.

It is evident from the geometry of the spacecraft that the center of percussion also lies within the triangle defined by the three points 160, 161 and 162 which are utilized in ejecting the spacecraft from the cradle. Since the spacecraft is of cylindrical configuration and the radial and circumferential distribution of elements housed within the spacecraft and/or supported by it or upon it is such that the mass center coincides with the geometrical center of the circular plan form and is disposed within the spacecraft body, as viewed in elevation, it is evident that the center of percussion will be between the center of mass of the spacecraft and the ejection force location. For instance with reference to FIG. 3 and assuming for the purposes of discussion that the center of mass is at the center of the circle defining the spacecraft, the center of percussion would be that point at which the application of the ejection force would produce no reaction at the pivot points 160, 161 while still providing linear and angular momentum to the spacecraft. The ejection force should always be applied to the side of the center of percussion such that a contact force results at points 160 161 and thereby negating need for elaborate holddown mechanisms. Although a spin stabilized spacecraft is described herein as the payload to be launched, it will be appreciated that any payload whether or not spin stabilized may be launched using the technique of this invention, such as three axis stabilized spacecraft or payloads otherwise stabilized or attitude controlled.

What is claimed is:

1. Apparatus for the gyroscopic ejection of a spacecraft from a support structure comprising:
   a spacecraft supporting cradle forming part of said support structure and having an open end;
   a spacecraft having at least one attachment member on one side thereof and at least two attachment members on the opposite side thereof in longitudinally spaced positions, said spacecraft straddling said open end and said attachment members releasably engaging said cradle and supporting said spacecraft in said open end of said cradle;
   said attachment members defining the corners of a triangle which encloses the center of mass of said spacecraft; and
   an ejecting mechanism having a part disposed between said cradle and said one attachment member to apply a tangential thrust force to one side of said spacecraft at the location of said one attachment member.

2. Apparatus as set forth in claim 1 in which, said spacecraft is spin stabilized and said ejecting mechanism imparts said rotary movement substantially about the spin axis of said spacecraft.

3. Apparatus as set forth in claim 1 in which, said support structure comprises a launch vehicle and means securing said cradle in said launch vehicle in a position supporting said spacecraft with its spin axis substantially paralleling the longitudinal axis of said launch vehicle.

4. Apparatus as set forth in claim 2 in which all of said attachment members lie in a plane including said spin axis.

5. Apparatus as set forth in claim 1 in which, said spacecraft has an additional member on said one side thereof providing four attachment members, two on each side thereof, in longitudinally spaced pairs in the same plane, three of said attachment members defining the corners of a triangle enclosing the center of mass of said spacecraft; and said ejecting mechanism applies said tangential force to said spacecraft at the location of said attachment member constituting the vertex of said triangle.

6. Apparatus as set forth in claim 5 in which the center of mass of said spacecraft lies substantially in the plane of said triangle.

7. Apparatus as set forth in claim 1 in which, said spacecraft has an additional attachment member, circumferentially positioned intermediate said opposite sides, and circumferentially slidably engaged with said cradle.

8. Apparatus as set forth in claim 5 in which said spacecraft has an additional attachment member circumferentially positioned intermediate said attachment members disposed on opposite sides thereof and circumferentially slidably engaged with said cradle.

* * * * *